US005949793A

United States Patent [19]

Bossard et al.

[11] Patent Number: 5,949,793

[45] Date of Patent: Sep. 7, 1999

[54] TRANSMISSION OF DIGITAL AND ANALOG SIGNALS IN THE SAME BAND

[75] Inventors: Bernard Bossard, New York, N.Y.; Charles Brand, Colts Neck, N.J.

[73] Assignee: Cellularvision Technology & Telecommunications, L.P., Freehold, N.J.

[21] Appl. No.: 08/681,189

[22] Filed: Jul. 22, 1996

[51] Int. Cl.[6] ................................ H04J 1/00; H04H 1/04

[52] U.S. Cl. ............................................ 370/487; 370/487

[58] Field of Search .................................... 370/487, 490, 370/493, 494, 495, 203, 485, 486, 334, 343, 480; 348/6, 7, 12, 13, 460, 465, 467; 455/3.1, 5.1, 6.3

[56] References Cited

U.S. PATENT DOCUMENTS

| | | | |
|---|---|---|---|
| 5,278,826 | 1/1994 | Murphy et al. | 370/486 |
| 5,450,392 | 9/1995 | Waltrich | 370/201 |
| 5,465,396 | 11/1995 | Hunsinger et al. | 466/61 |
| 5,559,808 | 9/1996 | Kostreski et al. | 370/517 |
| 5,594,937 | 1/1997 | Stiles et al. | 455/5.1 |
| 5,668,610 | 9/1997 | Bossard et al. | 348/723 |

*Primary Examiner*—Chau Nguyen
*Assistant Examiner*—Soon-Dong Hyun
*Attorney, Agent, or Firm*—David R. Treacy

[57] ABSTRACT

A combination of broadband program materials, such as TV, plus digital communications services of all types, are broadcast to a cell in the same frequency band, such as 27.5 to 28.5 GHz. The combination of all the transmitted channels have a combined bandwidth substantially exceeding the frequency band. At least some of the channels are transmitted with two diversity characteristics different from those of other channels. In one embodiment analog signals transmit the broadband services, preferably using wide deviation FM modulation, the FM channels filling the band. By choosing carrier frequencies selectively, between 5 and 9 T-1 digital channels can be broadcast in each FM channel when polarization is the same. Differing polarization of digital and FM signals in the same band can enable selection and detection of the desired one of a full spectrum of digital signals, or any one of the analog signals.

27 Claims, 9 Drawing Sheets

TRANSMISSION OF DIGITAL AND ANALOG SIGNALS IN THE SAME BAND

BACKGROUND OF THE INVENTION

1. Field of the Invention

The invention relates to systems for transmission of multiple information signals in a band; and more particularly to systems in which a plurality of signal channels are transmitted using respectively different carrier frequencies, and where it is desirable to occupy the entire band so that spectrum utilization is optimized.

2. Description of the Prior Art

Techniques for avoiding interference between different transmitted information streams are very old. The earliest technique involves the use of respectively different carrier frequencies for the different information streams. A tuned amplifier stage discriminates between the desired modulated carrier, and the undesired information streams with which other carrier frequencies have been modulated.

Another technique, exemplified by European Patent Application EP A 0 429 200 A2, involves the use of directionality and difference in frequency sets. Directionality means that certain signals are radiated by a first transmitting antenna array which is highly directional—the signal intended for reception by one customer is radiated in that direction, using an antenna array which has a relatively narrow beam angle, while signals for another customer, whose location relative to the first customer places him outside the first array's coverage, are transmitted by a second antenna whose coverage does not include the first customer. Additional protection against interference comes from using different "frequency sets," where one frequency set differs from another because the frequencies occupied by their channel bands are mutually exclusive, or they differ in direction of polarization.

SUMMARY OF THE INVENTION

According to the invention, a first plurality of signals are transmitted at respectively different carrier frequencies, occupying mutually exclusive individual channel bands within a given broad band, and at least one additional signal is transmitted within a respective other individual channel band lying within said given broad band, the sum of the widths of the mutually exclusive individual channel bands and the other individual channel band being greater than the given broad band. The at least one additional signal differs from the first plurality of signals in at least two diversity characteristics selected from a group including carrier frequency, modulation type, and polarization, such that a receiver in a given location can selectively receive any one of the transmitted signals.

In a first preferred embodiment of the invention, the first plurality of signals are digital transmitted signals, and the at least one additional signal is an analog signal occupying substantially the entire given band, transmitted at a carrier frequency different from the carrier frequencies of any of the first plurality of signals. Advantageously, a plurality of contiguous given bands occupy a broad band, and in at least a plurality of the given bands the analog signal is a respective FM signal occupying substantially all of the respective given band. In a further advantageous embodiment, at least one of the first plurality of digital signals has an individual band which occupies portions of two adjoining given bands.

With this embodiment, having a plurality of narrower signal channels where the sum of their bandwidths is less than the width of the given band, and a wide-band analog signal transmission covering all of the given band, at receiving locations covered by the transmitter any one or more of the digital signal transmissions and the analog signal transmission can be detected with a detected signal quality substantially equal to the quality that would result if only the digital signal transmissions or only the analog signal transmission were being received.

At that receiving location the received signal power level for each of the digital signal transmissions, considered individually, is desirably at least 18 dB less than the total received power level for the analog signal transmission; the ratio of digital signal power to analog signal power which will not result in unacceptable degradation of the analog signal is a function of the modulation type and bandwidth of the digital signal, and the location of the digital carrier signal with respect to the analog carrier signal. When the individual digital signal power is 30 dB lower than the analog signal power the location of the digital carrier signal with respect to the analog carrier is relatively unimportant insofar as reception of the analog signal is concerned. At higher digital signal powers, the location becomes more significant. Because of the nature of NTSC television signals, there are "sweet spots" where the digital signal causes insignificant degradation of the analog signal, and other relative locations which cause readily discernible impairment. The type of digital modulation is one variable which determines the digital signal strength which does not unacceptably degrade the received picture; and the artifacts caused by some digital signals are more objectionable than those resulting from other digital signals.

Over each individual portion of the frequency band occupied by the respective digital signal transmissions the received signal power level for the respective digital signal transmission should, in general, be not more than 6 dB greater than the received signal power level of the analog signal transmission within that same individual portion of the frequency band; and preferably the digital power is less than the analog power level, in particular, at least 12 dB less. However, there is usually no benefit from making the digital signal more than 15 dB lower than the analog signal power within that portion.

In a particular preferred embodiment of the invention, in a Local Multipoint Distribution Service (LMDS) cellular microwave system, the analog signal transmission is a frequency or phase modulated television or video signal, hereinafter referred to generally as an FM video signal. Digital signals transmitted from the same location (antenna mast) may be modulated according to any well-known method and are transmitted over a plurality of carrier frequencies which are selected to fall where the power in the FM signal is relatively low. To provide a low error rate for the digital signal, at the present time quadrature phase-shift keyed (QPSK) modulation is preferred. As technology developments continue, other modulation methods, such as 16 QAM or 64 QAM or still others not now known or much used, may prove desirable.

In a preferred mode according to the invention, the analog FM signal has a nominal FM deviation of 3 MHz. The spectral power density curve for a live television program showed the power peaks to be approximately a same value, concentrated over a band less than 6 MHz wide, and to fall off sharply so that it is down at least 6 dB over nearly 14 MHz, and down at least 10 dB over 12 MHz, of the entire 20 MHz nominal channel band. These values, as observed via a spectrum analyzer producing a "max hold" curve, do not reflect the instantaneous distribution, which varies continuously with changes in the picture; however, they suggest that, with careful selection of carrier frequencies at low points in the band, reception of both a high quality analog TV signal and at least 8 or 9 T-1 channels or their equivalent in the same 20 MHz band should be possible.

Alternatively, when the FM deviation is increased to 5 MHz, the center region of approximately constant power increased only to approximately 7 MHz, but with a more gradual drop to each side having a more irregular curve, so that it is down at least 6 dB over approximately 12 MHz, and down at least 10 DB over 8.5 MHz, of the same total channel band. These values suggest that, with careful selection of carrier frequencies at low points or "sweet spots' in the band, reception of both a very high quality analog TV signal and at least 7 T-1 channels or their equivalent in the same 20 MHz band should be possible.

According to another aspect of the invention, signals of different modulation type are transmitted with different polarization. This permits use of the full bandwidth for each modulation without interference at the subscriber's location, because each signal has two diversity characteristics which the receiver uses to discriminate against the interfering signal. Where channels are used for one way transmission only, a high degree of freedom from intercell interference can be obtained by alternating the assignment of modulation type to a given polarization in adjoining cells. According to a further preferred embodiment according to this aspect of the invention, if any channels are used for two way communication with subscriber locations, return signals are desirably transmitted using the same modulation type as the signals being answered, but with the other polarization. An advantage of this operating mode is that undesirable reflected signals, which were transmitted from and are reflected back and received at the cell node being considered, have a different polarization from signals of that modulation type which are desired return signals. Interference is still further reduced if return (upstream) signals are transmitted with different carrier frequencies.

Yet another embodiment provides an extremely large number of channels in a given total bandwidth. For each polarization a full number of analog channels is transmitted, and a number of digital channels which will not cause unreliable reception of the analog channels. If a transmitter is being operated without any closely adjacent cells, then it should be satisfactory if the analog cells operate with corresponding channel carrier frequencies. However, at some reduction in the commonality of transmitting and receiving modules, interference between program or digital signals both within a cell and from other cells can be reduced by frequency interleaving. The principle used here is that at one end of the band approximately half an analog channel space is not used for analog transmission. Using one polarization, a lower channel group have analog carrier signals spaced approximately normally, sequentially up from a channel beginning at the lower end of the band; and digital carriers are transmitted at selected frequencies different from (and, where the interference characteristics require it, well removed from) the analog carrier frequencies. Using the other polarization, the upper channel group have analog carrier signals spaced approximately normally, sequentially up from a channel beginning approximately midway between the lowest and next lowest of the lower group. Thus, with respect to each other, the channels of one analog group have two diversity characteristics aiding discrimination against signals from the other analog group. Again, digital carriers are transmitted at selected frequencies well removed from the upper group analog carrier frequencies. Depending upon the FM (or other modulation) deviation and channel bandwidth selected, experimentation will show the location of the "sweet spots' in the spectrum for locating digital carriers to minimize interference with the analog signal, and obtain reliable reception of both modulations. Further, it may be advantageous to modify the analog channel spacing slightly so that the sweet spots of the upper channels are somewhat interleaved with the sweet spots of the lower channels; and perhaps to use fewer digital channels in one or both polarizations, than would be feasible if only one polarization and set of analog channels were in use. This arrangement should reduce the error rate experienced in detection of the digital signals whenever insensitivity to signals of the other polarization is less than ideal, and can minimize intercell interference. The result is approximately a doubling of the number of analog TV or other programs which can be transmitted, and an increase in the number of digital channels. However, it will be desirable that any return signals be on channels dedicated for that purpose.

With this embodiment omnidirectional transmission is acceptable and may be less expensive if cells are not close or overlapping. However, use of sectors is especially advantageous, arranged such that a sector with lower channels on one polarization is flanked by sectors with upper channels on that polarization. A cellular array is desirably set up so that sectors facing each other have the same channel/polarization combination. It is also desirable that the sector sizes and directions be selected such that a subscriber near the overlap between two sectors does not face the transmitter of a nearby other cell.

The invention is particularly useful for transmission in the UHF or SHF spectral bands utilizing radio transmission which operates essentially as line of sight propagation, where governmental regulations make it difficult to increase the number of signal channels to match demand, but channel bandwidths are relatively small compared to the carrier frequencies. It may also be applied for any other type of transmission where desire for more channel capacity exceeds technological capability of using a broader spectrum.

Particularly when it is desirable to reduce initial capital costs, a system can initially be provided which has a minimum of duplicated equipment at the transmitting sites, even though this reduces the number of digital channels available. Subscribers can be offered a minimum cost choice of analog only, or additional digital services at higher monthly cost. Subsequently the system can be upgraded to use sectorizing and polarization diversity within the cell without need for replacing any original equipment; the major disadvantage of this business plan is that at a changeover time, the polarization angle for some subscriber antennae will require changing. However, the subscriber antennae used for the preferred frequency bands are so small that they are readily realigned by the individual subscribers.

DESCRIPTION OF THE PREFERRED EMBODIMENTS

Figure 1:
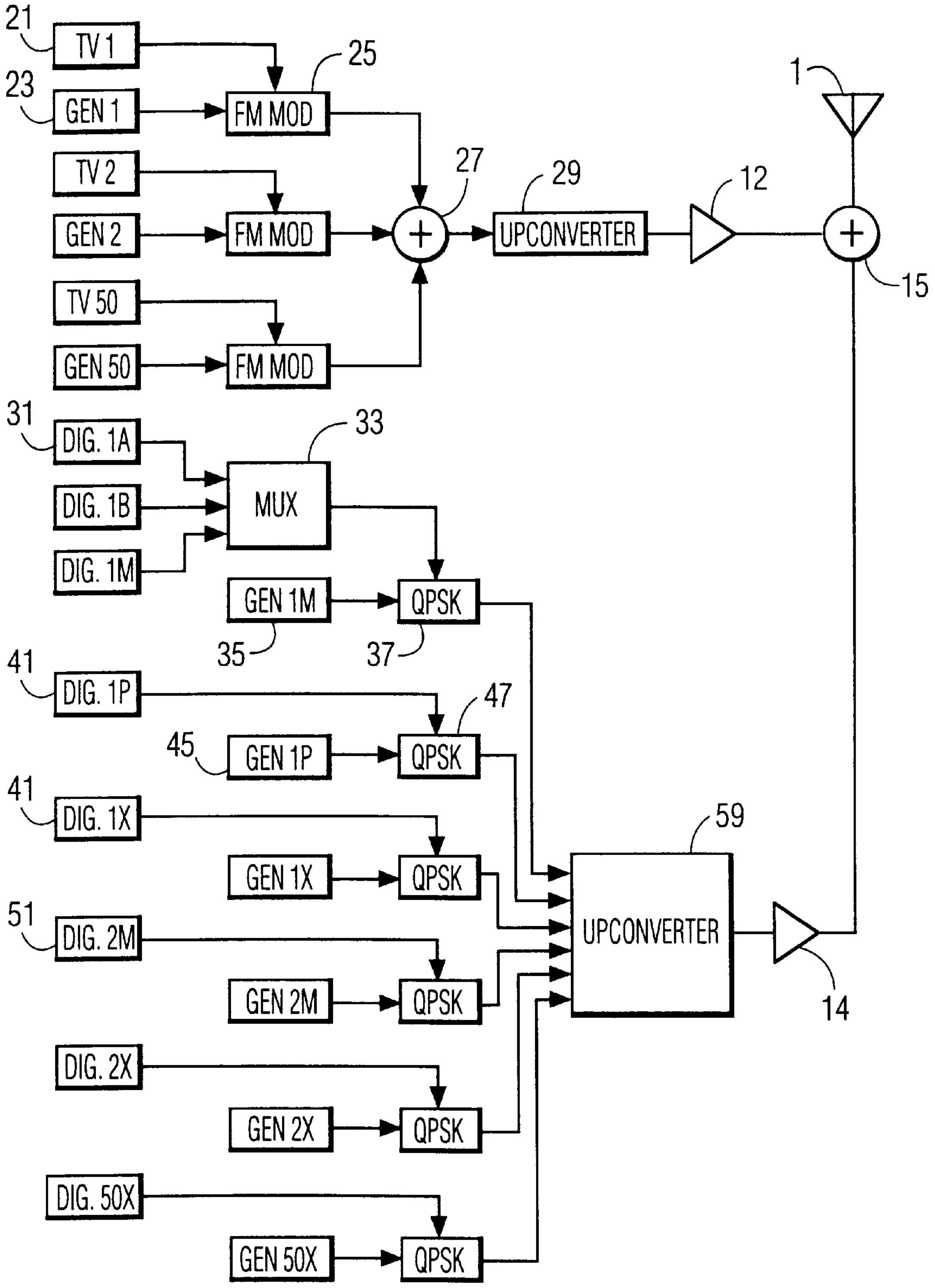
FIG. 1 is a schematic view of a system according to the invention using a common transmitting antenna.

The system shown schematically in FIG. 1 transmits a combination of fifty frequency modulated television signals and a far greater number of digital signals to subscribers in a cell, from an omnidirectional antenna 10, shown conceptually as a single omnidirectional antenna fed from an adder 15, although it may be formed from two or more sectorized antennae. Preferably two transmitting power amplifiers 12, 14 are used. For added reliability of service, it is desirable that the transmitting power amplifiers be arranged with back-up switching, described in applicants' co-pending application Ser. No. 08/684,651 filed Jul. 19, 1996 for DUAL TRANSMITTER ARRANGEMENT WITH BACK-UP SWITCHING.

Video and audio signals for analog channels 1–50 are produced by a local TV source, or received by a relay link of any well known kind, represented generally by boxes 21. Each channel has a separate RF generator 23 whose output is fed to an FM modulator 25 where it is modulated by the respective TV signals. The modulator is preferably designed to provide a nominal 3 MHz FM deviation, so that the energy is concentrated in the central 6 MHz of the 18 to 20 MHz band to be transmitted. These modulated RF signals are combined, as shown schematically by adder 27, and upconverted to a 1 GHz wide SHF band, for example between 27.5 and 28.5 GHz, in an upconverter 29. It will be recognized by those of ordinary skill that it may be most economic that all the RF generators 23 operate at the same frequency, so that these generators and associated modulators are identical, and that the modulator outputs are then individually upconverted to separate 20 MHz wide channels in an intermediate band, such as between 2.1 and 3.1 GHz, before being upconverted as a group to the 28 GHz band.

Digital signals representing many different kinds of communication can be transmitted at frequencies falling within the same 50 FM channels. For example, low data rate signals are represented by inputs 1A–1M obtained from sources 31. To minimize the number of carrier frequencies and modulators required, these low rate signals, such as individual telephone, facsimile, computer modem or other data terminal, are desirably combined in multiplexer 33 to produce an output at a data rate of at least 1 MB per second, for example equivalent to a conventional T-1 line. The output from a first data carrier frequency generator 35 is modulated in a quadrature phase shift keyed modulator 37 by the data stream from multiplexer 33.

Similarly, up to 9 other T-1 digital data source, represented by boxes 41, are QPSK modulated at carrier frequencies 1P–1X produced by generators 45 and modulated by modulators 47. These carrier frequencies may, for example, lie in the 2.10–2.12 GHz band, or be upconverted to that band, with the individual data carrier frequencies chosen to avoid the carrier frequency of the lowest FM channel, and to be placed in the "sweet spots" where the digital transmission produces minimum deterioration of the FM TV reception.

For transmission at carrier frequencies falling within the second FM TV channel, digital signal sources 51 are QPSK modulated at (or modulated and upconverted to) carrier frequencies corresponding to those used for digital transmission within the lowest FM channel. Additional digital sources may be modulated at similarly selected carrier frequencies for all the other FM channels. The entire set of digitally modulated carriers are raised in frequency to the 27.5 to 28.5 GHz band in upconverter 59.

Figure 2:
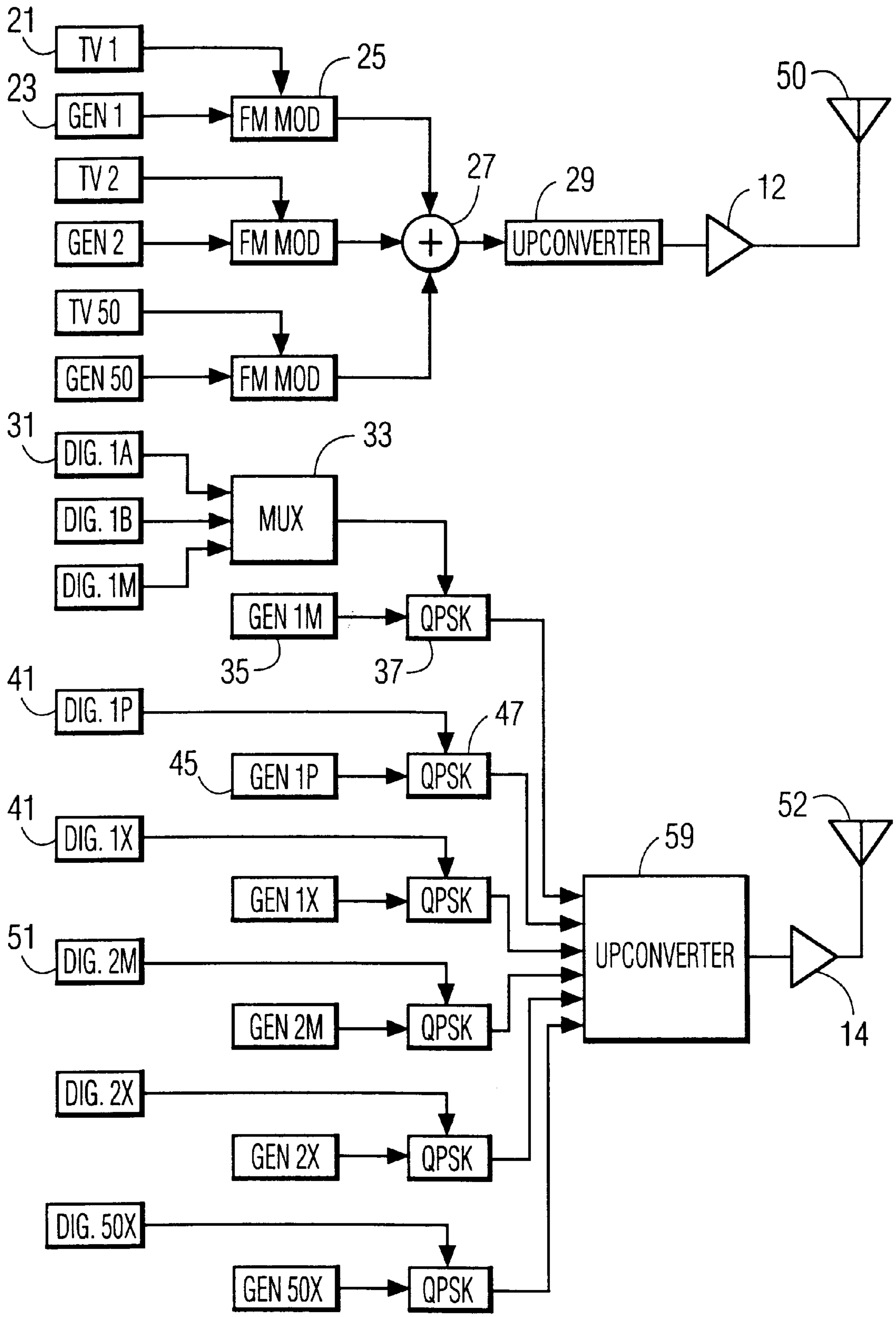
FIG. 2 is a schematic view of a system according to the invention using antennae with different polarizations.

The system of FIG. 2 is like that of FIG. 1, except that the antenna 50 carries only analog signals, and may be a sectorized antenna; and a plurality of digital boxes 31–59 may be provided, feeding respective sector antennae 52. According to one embodiment according to FIG. 2, further described with respect to FIG. 6, each antenna is omnidirectional; one is polarized horizontally, and the other is vertically polarized. This arrangement permits a greater number of digital carriers to be transmitted in the same band as the FM signal without interference at the receiver, even to the point where one digital carrier can be at the same frequency as the FM carrier, and the entire bandwidth of the FM channels is filled with digital signals.

In another embodiment described by the diagram of FIG. 2, at least antenna 52 is a sectorized antenna, and each sector is preferably fed from a separate amplifier 14 and upconverter 59. When a FIG. 2 system is used in a cellular array like those shown in FIGS. 3, 4 or 7, for example, some of the digital sources 31, 41, 51 may be transmitted to all the sectors of a given cell, while others are unique to one of the sectors. This permits reuse of portions of the spectrum for transmission of different digital signals, intended for individual subscribers located in differing sectors. Further, reliability can be enhanced if each of the upconverter/amplifier combinations is arranged as a dual transmitter arrangement using back-up switching, referred to above.

Figure 3:
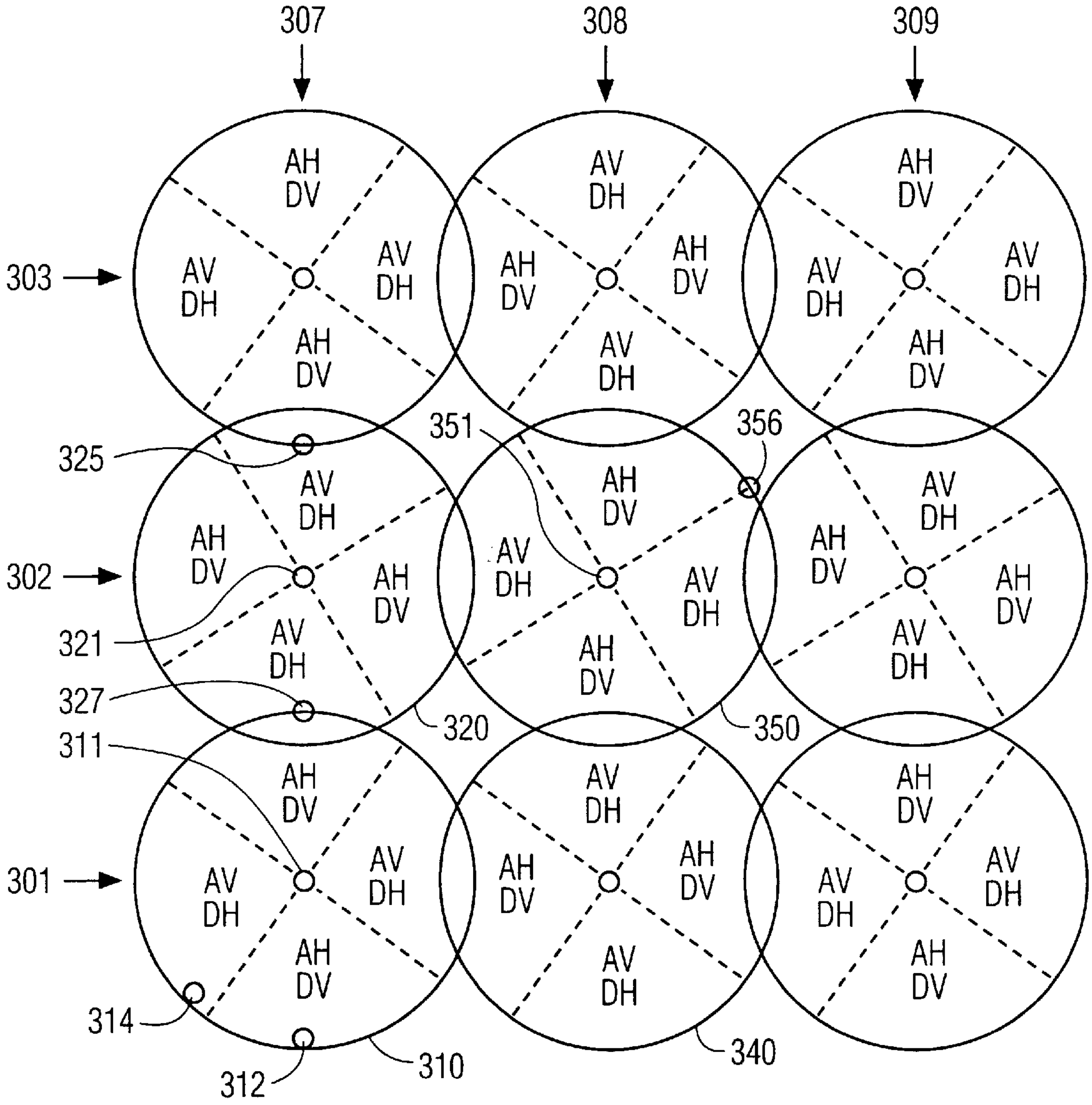
FIG. 3 is a chart showing a cellular transmitting arrangement according to the invention, having 90° sector antennae for transmission in each cell.

A rectangular cellular layout of transmission sites according to the FIG. 2 embodiment is shown in FIG. 3, in which 90° sectors are used. The cells are arranged approximately in rows 301, 302, 303 etc. and columns 307, 308, 309, etc. As is clearly shown, in each cell the four quadrants alternate between vertical and horizontal polarization of the analog signal (denoted AV and AH), with the other polarization DH and DV for the digital signal. This array minimizes adjacent cell interference. For example, a subscriber at location 312 in cell 310, whose narrow beam antenna is pointing at both the transmitter 311 of cell 300 and the transmitter 321 of cell 320, receives an interfering signal from cell 320 which, for the given type of modulation, is of the other polarization as well as attenuated more than 6 dB by the difference is distance. A subscriber at location 314, whose antenna is directed at both the transmitter 311 of cell 310 and the transmitter 351 of cell 350, likewise has a polarization difference for the signals being transmitted from cell 350.

The skewing of the sector pointing angles further ensures that a subscriber located near the boundary of two sectors, such as location 356, whose signal strength is typically reduced 3 DB because of being near the edges of the sectors, does not receive any direct signal from either cell 310 or 350. Further, the change of polarization between adjacent sectors largely eliminates the problem of interference fringe patterns where the radiation patterns of the two sector antennae overlap.

Where the digital signals are used for two way communication a cell 320 subscriber at location 325 may transmit a vertically polarized return signal to the transmitter location 321. This vertically polarized signal should not normally cause interference for a subscriber at location 327 because the signal being transmitted as a return is relatively weak (the large aperture of the receiving antenna at the transmitter location 321 compensates for the reduced return transmitter power). At the same time, the vertical digital return from location 325 will not cause a problem at transmitter site 311, because the receiving sector for that direction is set to receive horizontally polarized digital return signals.

Avoidance of interference can further be improved in a two-way system when dynamic channel assignments are made for various subscribers or customer premises equipment, based on their location within a cell.

Figure 4:
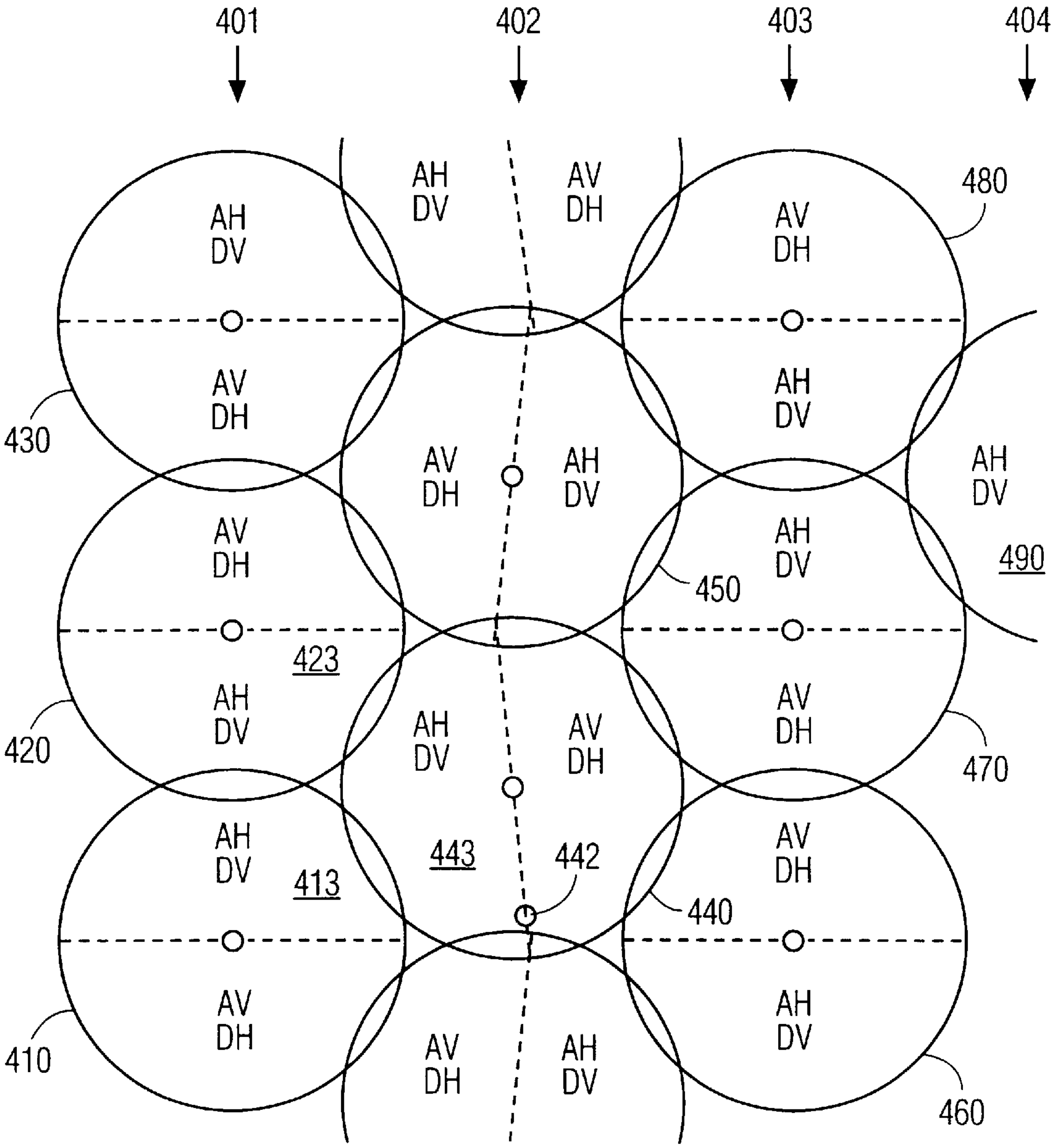
FIG. 4 is a chart showing another cellular transmitting arrangement according to the invention, having 180° sector antennae in each cell.

FIG. 4 shows another array having 180° sector antennae, using opposite polarization respectively for the analog and digital signals in a given sector, and with facing sectors having same polarizations. An array of this sort may be termed a densely packed array, because it provides a minimum of overlap while at the same time having a minimum of area which is nominally not in any cell. The array may be considered to be arranged in columns 401, 402, 403, 404 and so on. The antennae in alternate columns 401, 403 etc. are aligned approximately in a straight line, and each sector antenna is aimed approximately parallel with the column alignment. As a result, the dashed lines showing the division between the two sectors of each cell are approximately perpendicular to the straight line. In this column, the analog polarization arrangements are like those shown in co-pending application Ser. No. 08/566,780. The sector 413 of cell 410 facing cell 420 transmits the analog FM signal with horizontal polarization, and the digital signal with vertical polarization, as does the sector 423 of cell 420 facing cell 410.

Row 402 has a completely different alignment. Each of its cells overlaps a respective two cells in column 401, and a respective two cells in column 403. The division lines between sectors are approximately parallel to the column direction, but adjacent cells in this column have mutually different polarizations to the same side. The sector 443 of cell 440, facing sectors 413 of cell 410 and 423 of cell 420, has the same horizontal analog polarization that they have. To minimize interference from adjoining cells, such as cell 450, at subscriber locations such as location 442 near the dividing line between the sectors of cell 440, the dividing lines are canted at a small angle, at least equal to the half angle of the beam angle of the subscriber receiving antennae. Therefore the subscriber at 442 would set his analog antenna to vertical polarization, because any intercell interference from cell 450 will be horizontally polarized. It can also be seen that, if digital two way communication is desired having the return signal oppositely polarized from the received digital signal, a subscriber who is on a line connecting two adjacent cells in the same or in adjoining columns will be transmitting an opposite polarity to the return signals in the adjoining cell.

Figure 5:
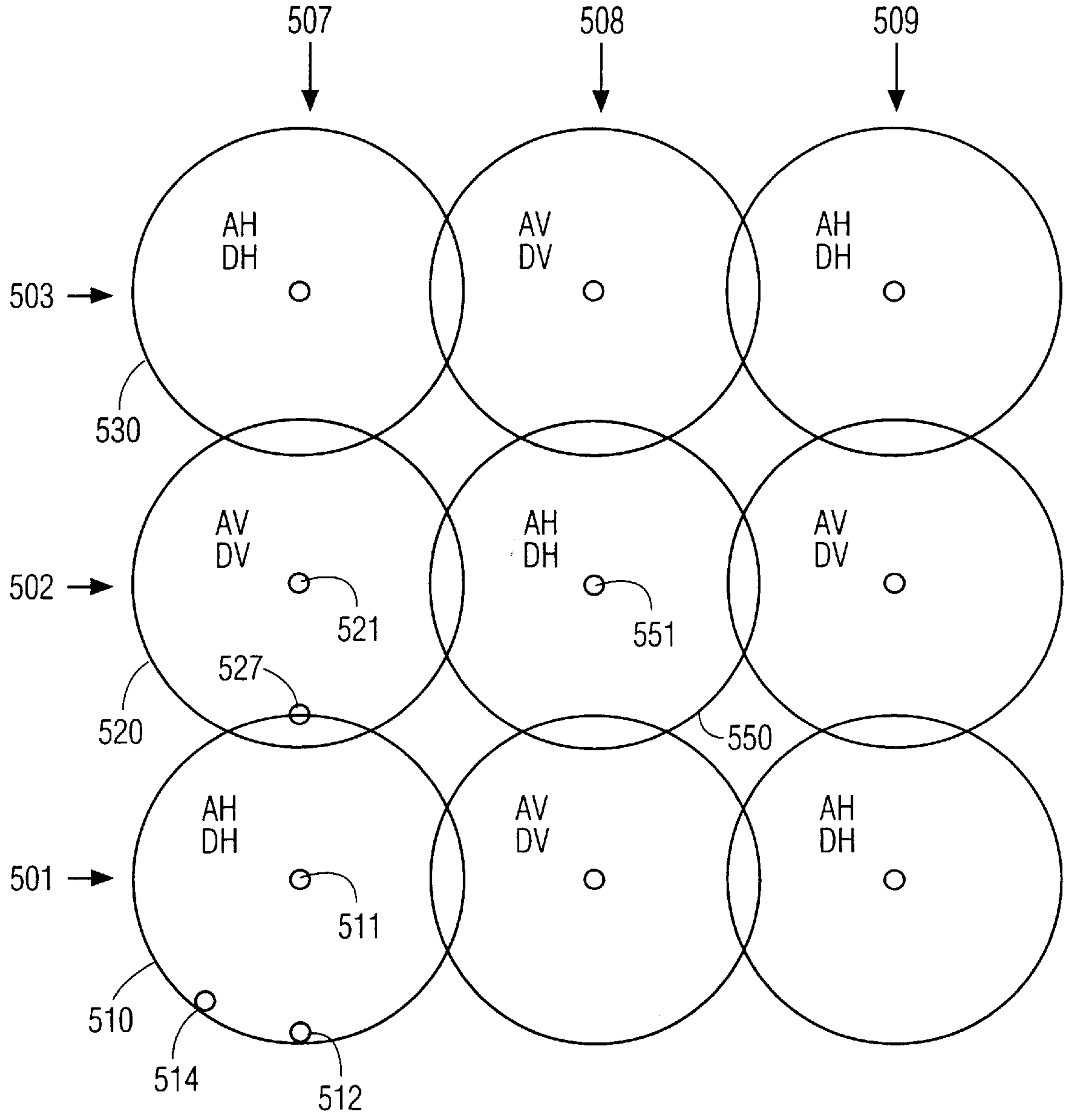
FIG. 5 is a chart showing a further cellular transmitting arrangement according to the invention, having same polarization omnidirectional transmission in each cell.

The cellular array of FIG. 5 shows the use of omnidirectional antennae for analog signals, and in the same cell an omnidirectional antenna of the same polarization for digital transmission. In rows 501, 502 and 503, and columns 507, 508, 509 adjacent cells alternate polarization, so that cells 510, 530 and 550 have same polarizations. A cell 510 subscriber at location 512 has both a polarization difference and distance attenuation to prevent intercell interference from the cell 520 transmitter at location 521; however, at location 504 there is only distance attenuation of the signal from the cell 550 transmitter at location 551. This arrangement provides a great simplification in transmitting equipment, but limits the number of digital channels which can be transmitted without interfering with the analog signal. With this arrangement it is further desirable that two way communication use return frequencies which differ from the digital transmission frequencies, so that a horizontally polarized digital return signal from a subscriber at location 527 can be detected at location 521, in the presence of the possibly equal or greater horizontally polarized digital signal from location 511.

Figure 6:
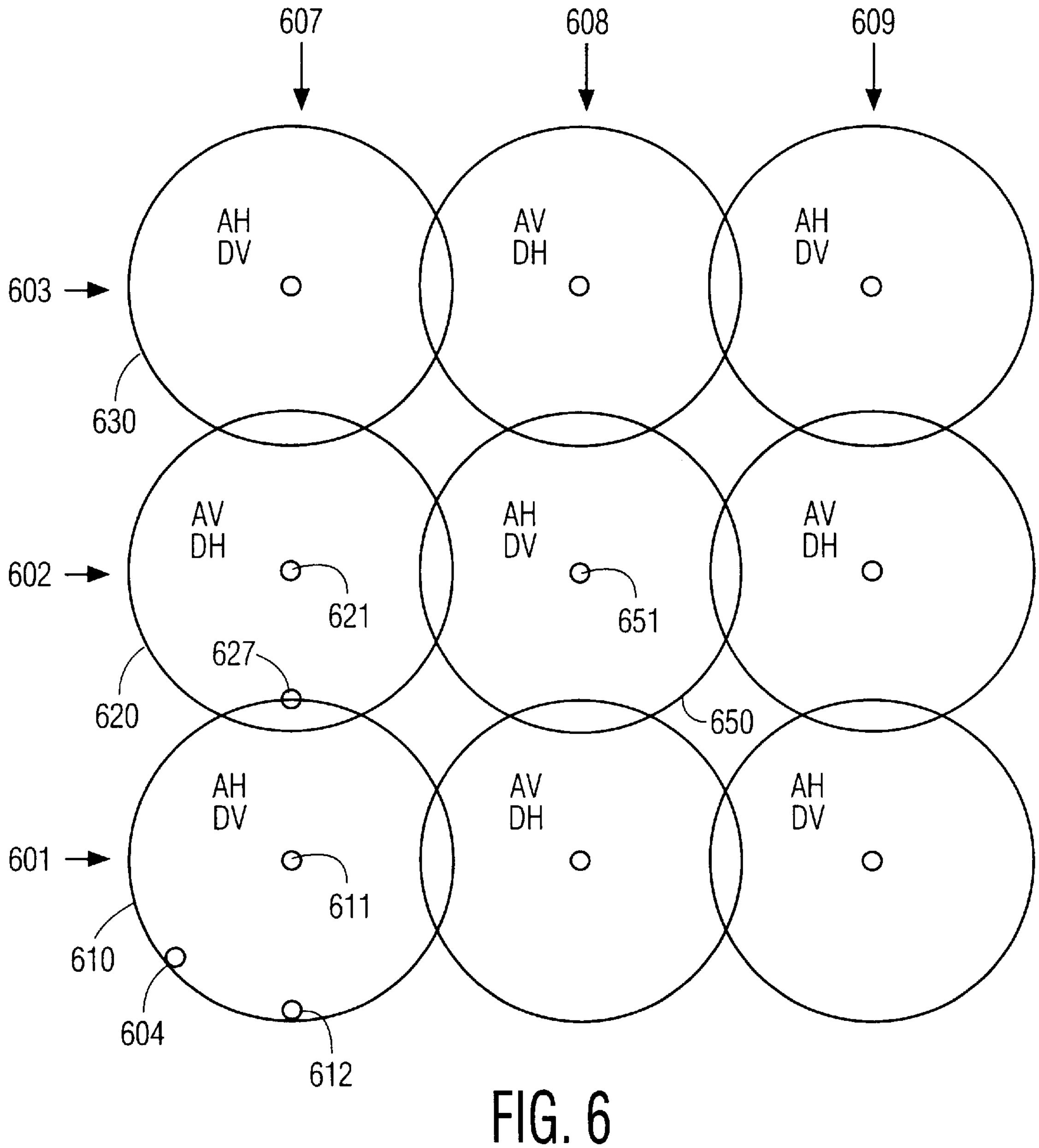
FIG. 6 is a chart showing a cellular transmitting arrangement according to the invention, having omnidirectional transmission in each cell.

The cellular array of FIG. 6 shows the use of omnidirectional antennae for analog signals, and in the same cell an omnidirectional antenna of the opposite polarization for digital transmission. In rows 601, 602 and 603, and columns 607, 608, 609 adjacent cells alternate polarization, so that cells 610, 630 and 650 have same polarizations. As a result, a cell 610 subscriber at location 612 has both a polarization difference and distance attenuation to prevent intercell interference from the cell 620 transmitter at location 621; however, at location 604 there is only distance attenuation of the signal from the cell 650 transmitter at location 651. With this arrangement it is again desirable that two way communication use return frequencies which differ from the digital transmission frequencies, so that a vertically polarized digital return signal from a subscriber at location 627 can be detected at location 621, in the presence of the possibly equal or greater vertically polarized digital signal from location 611. However, because of the different polarization between the analog and digital frequencies being transmitted in each cell, essentially the entire band can be filled with digital channels.

Figure 7:
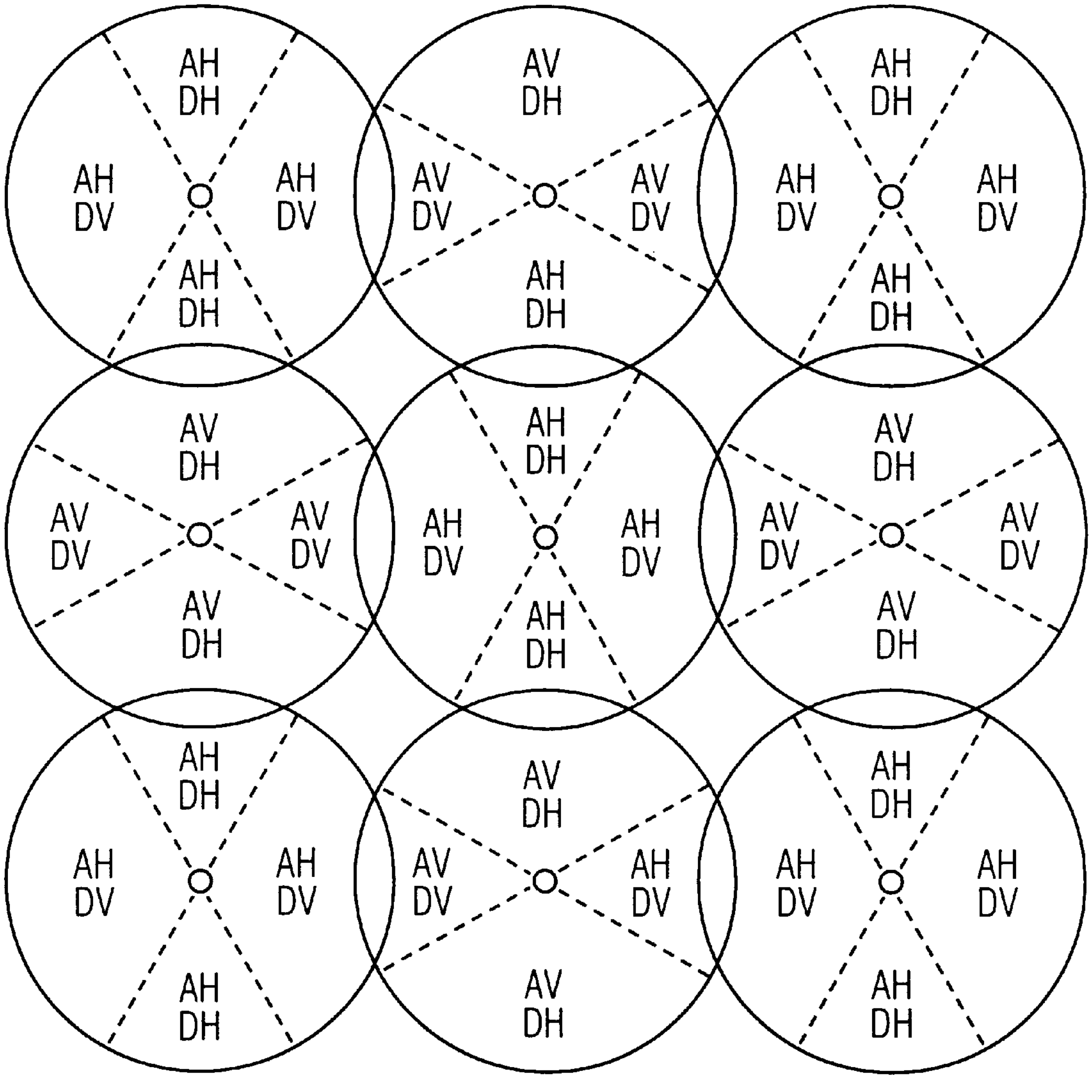
FIG. 7 is a chart showing yet another cellular transmitting arrangement according to the invention, having omnidirectional analog and unequal sectorized digital transmission in each cell.

The cellular array of FIG. 7 shows the use of omnidirectional antennae for analog signals, and in the same cell unequal width sector antenna of alternating polarizations for digital transmission. In rows 701, 702 and 703, and columns 707, 708, 709 adjacent cells alternate the analog (FM) polarization, so that cells 710, 730 and 750 have a same analog polarization, similar to FIGS. 5 and 6. However, the digital sectors are arranged so that, as in FIG. 4, like polarizations are radiated toward each other. Because the number of digital channels that can be transmitted without interfering with the FM signal is lower when their polarizations are the same, the digital sector which has same polarization as the analog signal transmits over a narrower beam antenna, such as 60° beamwidth; while the sector having different digital polarization transmits a 120° beam. An arrangement of this type permits reaching approximately equal numbers of subscribers with uniquely selected digital channels in all directions within the cell.

Figure 8:
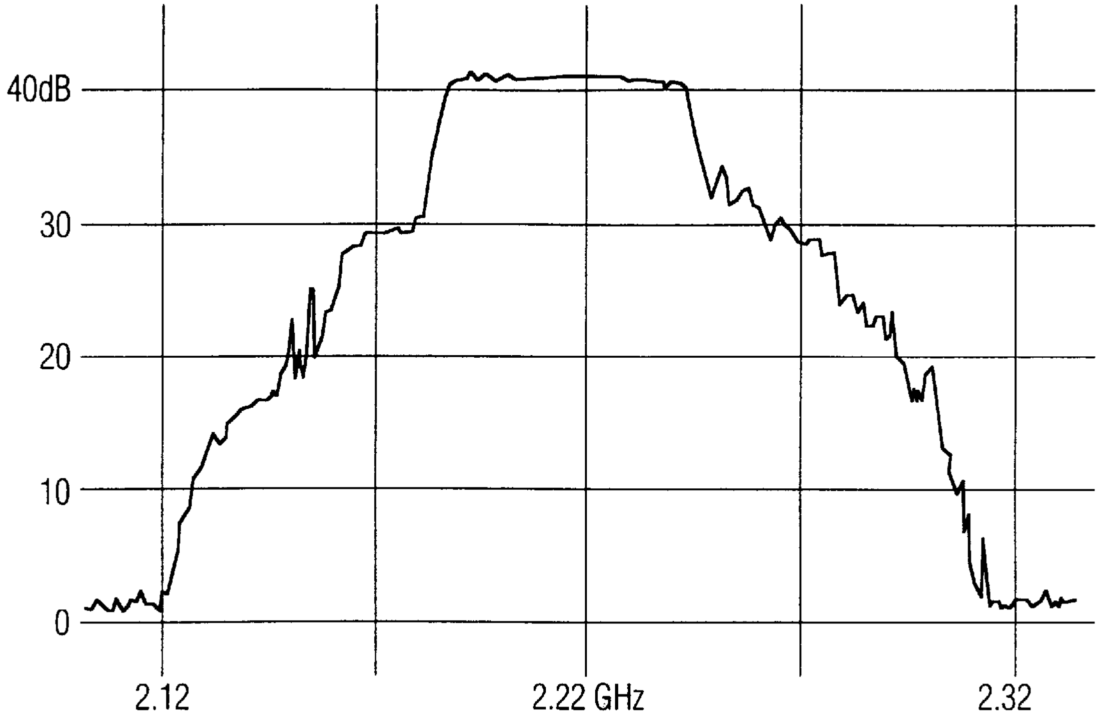
FIG. 8 is a graph of the spectrum of a 3 MHZ deviation FM video signal suitable for use in the invention.

FIG. 8 is a graph, of the "max hold" type described above, of the power density spectrum of a 3 MHz deviation FM live TV program. The sweep time was 1 second per division (5.0 MHz). This spectrum shows that the signal power peaks are heavily concentrated in a band slightly less than 6 MHz wide, and that it is at least 10 dB below the center value outside an asymmetric region about 7.5 MHz wide. This curve suggests the possibility of transmitting at least 8 or 9 T-1 channels of digital signals, each at a 1.544 MB/sec rate, without serious degradation of the FM signal.

Figure 9:
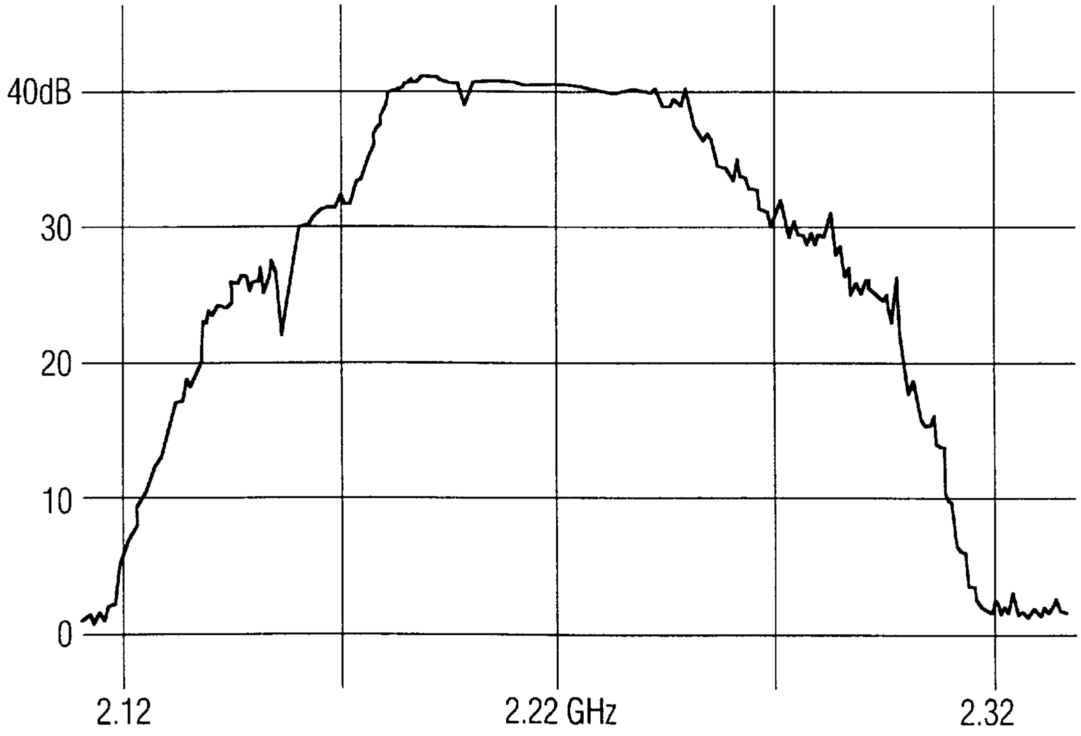
FIG. 9 is a graph of the spectrum of a 5 MHZ deviation FM video signal suitable for use in the invention.

FIG. 9 is a graph, similar to FIG. 8, where the deviation is increased to 5 MHz. The central area of substantially constant power peaks is widened to 7 MHz, and the shallower slope of the skirts causes the spectrum to be at least 6 dB down outside a region about 8 MHz wide, and at least 10 dB down outside an asymmetric region approximately 11 MHz wide. This curve suggests the possibility of transmitting at least 6 T-1 channels (each 1.544 MB/sec) in a 20 MHz analog FM channel, without serious degradation of the analog signal.

Figure 10:
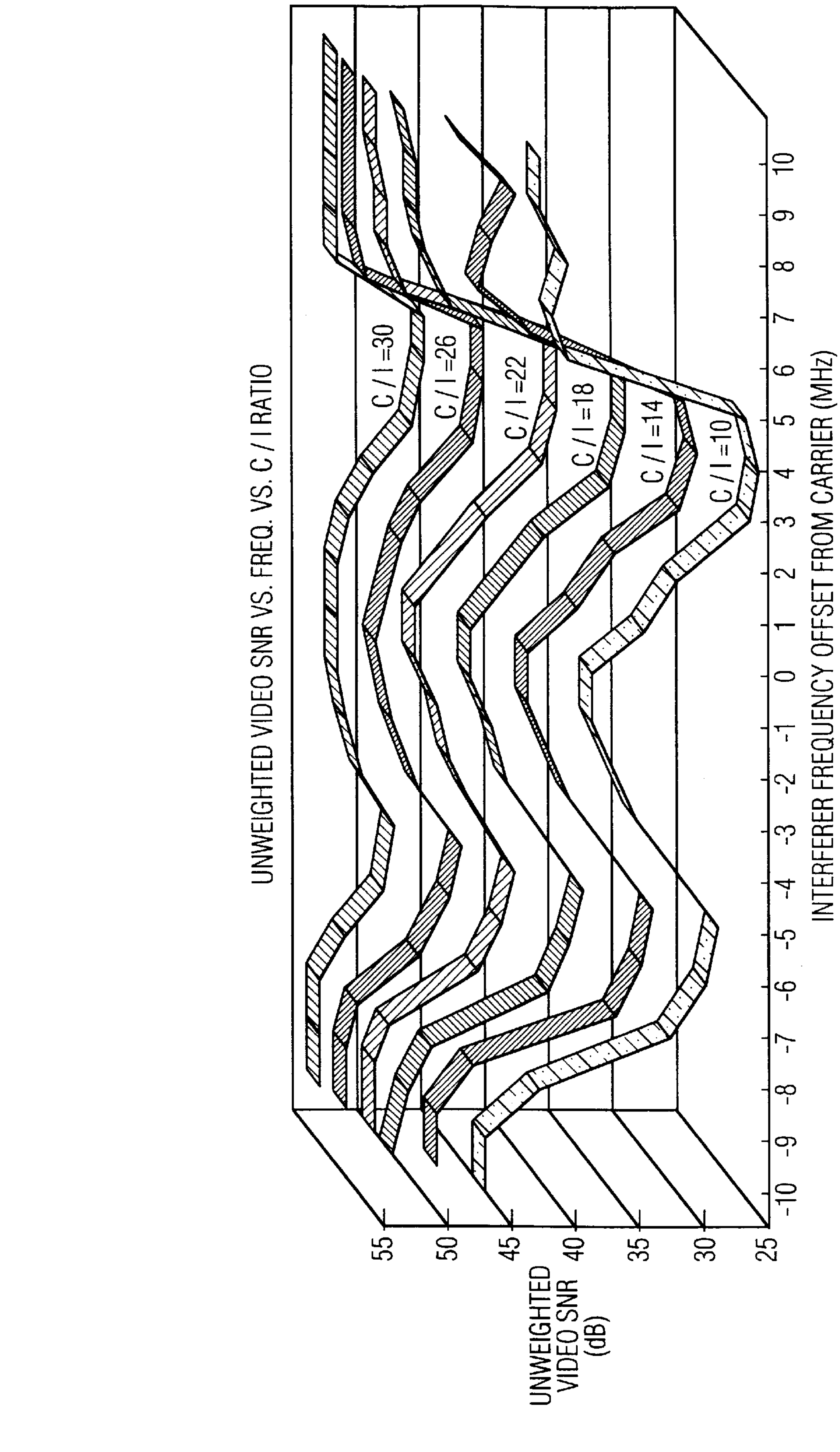
FIG. 10 is a graph showing the interference tolerance of an FM video signal versus carrier frequency of a T-1 QPSK signal.

The graph of FIG. 10 shows the video signal to noise ratio, in dB, for different ratios of carrier signal to interferer signal. These curves clearly show two broad "sweet spots" in which the presence of digital data does not seriously degrade the TV signal.

The curves in FIGS. 8–10 have a noticeable asymmetry. However, there is no requirement that the individual digital signals respect the boundaries of the 20 MHz FM channels, so the digital carrier frequencies can be selected solely to minimize interference with the analog TV signals.

Those of ordinary skill in the art will recognize that many variations of and alternatives to the embodiments described above fall within the spirit of the invention. For example, other orthogonal polarizations may be used, rather than vertical and horizontal. The digital signals being carried are not limited to T-1 conventional types, but rather can be digital TV signals, which may or may not be compressed; narrow band data streams, or broader bands than T-1; videophone signals; high speed computer data transfer; or any others which may be known or become known. Different digital channels can use different modulation types or bit rates, and be of different channel bandwidths, within one analog band or different analog bands. The analog signals are not limited to frequency modulation; phase modulation is at least one of the other possibilities. One or more of the "analog" channels can carry signals which are markedly different from TV signals. One transmitting site can transmit over two or three separated frequency bands, utilizing the invention in one, two or all three bands, such as 27.5 to 28.35 GHz, 29.1 to 29.25 GHz and 31.0 to 31.3 GHz. The invention is not limited to microwave frequencies, but is usable whenever a broad spectrum signal is transmitted with a different modulation from a narrower spectrum signal. Thus it is clear that the invention is measured solely by the appended claims.

What is claimed is:

1. A method of transmitting a plurality of signals within a frequency band from a transmitting location, for selective reception by a subscriber receiver located within a cell, comprising:

transmitting analog signals occupying substantially all of said frequency band, with a given polarization, said analog signals including program signals representing at least one communicated program transmitted at a program carrier frequency within the band and occupying one program channel, characterized in that the method further comprises:

transmitting digital signals representing at least one digital communication, at a first bit rate, using at least a first carrier frequency which is within said program channel, said digital signals being entirely within said band and occupying substantially less of said frequency band than the analog signals representing said one communicate program, selecting said first carrier frequency, said first bit rate, and a given transmission power of the digital transmission such that a subscriber receiver can selectively receive and reliably detect either said one communicate program or said digital communication, and reducing interference between the digital and the analog signals by transmitting the digital signals with a polarization which is different from said given polarization.

2. A method as claimed in claim 1, characterized in that said analog signals and said digital signals are transmitted over a first sector in which the analog signals have a first polarization, further comprising:

transmitting said analog signals over a second sector adjoining said first sector with a polarization different from said first polarization, and transmitting further digital signals in said second sector with said first polarization.

3. A method as claimed in claim 2, characterized in that said further digital signals include at least a second digital communication not transmitted in said first sector.

4. A method as claimed in claim 2, characterized in that the method further comprises:

transmitting said analog signals over third and fourth sectors, arranged such that the polarization of the analog signals is different in adjoining sectors, and each of the sectors is approximately a 90° sector, and transmitting third and fourth digital signals in the third and fourth sectors respectively.

5. A method as claimed in claim 4, characterized in that the method further includes transmitting additional signals from transmitting location in adjoining cells, characterized in that the cells are arranged such that sectors in adjoining cells facing each other transmit signals of like modulation and like polarization toward each other.

6. A method as claimed in claim 1, characterized in that said digital signals are a first plurality of digital signals, said analog signal and said first plurality of digital signal are transmitted over a first sector having a sector angle not substantially greater than 180°, and said analog signal and a second plurality of digital signals are transmitted over a second sector adjoining but not substantially overlapping said first sector, at least said second plurality of digital signals being transmitted with a polarization different from the polarization with which the first plurality is transmitted.

7. A method of transmitting a plurality of signals within a frequency band from a transmitting location, for selective reception by a subscriber receiver located within a cell, comprising:

transmitting analog signals occupying substantially all of said frequency band, with a given polarization, said analog signals including program signals representing at least one communicated program transmitted at a program carrier frequency within the band and occupying one program channel, characterized in that said method further comprises:

transmitting digital signals representing at least one digital communication, at a first bit rate, using at least a first carrier frequency which is within said program channel, said digital signals being entirely within said band and occupying substantially less of said frequency band than the analog signals representing said one communicated program, said analog signals being transmitted over a given coverage angle in said cell, and said digital signals being transmitted in a first sector having a coverage angle less than said given coverage angle, and selecting said first carrier frequency, said first bit rate, and a given transmission power of the digital transmission such that a subscriber receiver can selectively receive and reliably detect either said one communicated program or said digital communication.

8. A method as claimed in claim 7, characterized in that said given coverage angle is 360°.

9. A method as claimed in claim 8, characterized by further comprising transmitting further digital signals at frequencies within said program channel in a second sector, with a polarization different from said same polarization.

10. A method of transmitting a digital signal to a receiver, comprising:

transmitting an analog signal using a given carrier frequency, said analog signal occupying substantially all of a frequency band, transmitting the digital signal using a first carrier frequency which is within said frequency band, at a given bit rate, said carrier frequency and bit rate being selected such that the digital signal occupies a portion of said frequency band entirely to one side of the given carrier frequency, and a region occupying at least approximately 10% of said frequency band centered about said given carrier frequency is substantially free from the digital signal, and selecting the power level of transmission of the digital signal such that the signal power level of the digital signal received by the receiver, over said portion of the frequency band, is no more than 6 dB greater than the signal power level of the analog signal over said portion.

11. A method as claimed in claim 10, characterized in that a plurality of said digital signals are transmitted over corresponding separate portions of said frequency band, and the total signal power level of the respective digital signals received by the receiver is less than the total received analog signal power level.

12. A method as claimed in claim 11, characterized in that the respective received signal power level of each of said digital signals is at least 12 dB less than the received analog signal power level in the corresponding separate portion of the frequency band.

13. A method as claimed in claim 11, characterized in that the digital signals and the analog signal are transmitted from a same transmitter location with a same polarization.

14. A method as claimed in claim 13, characterized in that the analog signal is transmitted omnidirectionally with a given polarization, said digital signal is transmitted over a first sector having a beam angle less than 180°, and a plurality of further digital signals are transmitted over a second sector with a polarization different from said given polarization, said plurality of further digital signals being transmitted at carrier frequencies within said band, and said first and second sectors having no substantial angular overlap.

15. A method as claimed in claim 14, characterized in that said second sector is wider than said first sector.

16. A method as claimed in claim 14, characterized in that at least another plurality of digital signals are transmitted in a third sector having no substantial overlap with said first or second sectors, and adjoining sectors have mutually different polarizations.

17. A method as claimed in claim 10, characterized in that the analog signal is an FM signal having a substantially constant power level, and the digital signal is a quadrature phase shift keyed signal.

18. A method as claimed in claim 17, characterized in that the analog signal occupies a band of more than 3.3 MHz, and the digital signal occupies an approximately 1.5 MHz wide portion of the band.

19. A method as claimed in claim 18, characterized in that the analog signal is a television signal which occupies a band greater than 16 MHz wide.

20. A transmitter arrangement comprising:

means for transmitting an analog signal using a given carrier frequency, from a given location, with a given polarization, said analog signal occupying substantially all of a frequency band, and means including at least one antenna for transmitting at least one digital signal using a first carrier frequency which is within said frequency band, from approximately said given location, with said given polarization, the digital signal occupying a portion of said frequency band entirely to one side of the carrier frequency for the analog signal, a region occupying at least approximately 10% of said frequency band centered about said carrier frequency being substantially free from the digital signal, and the power level of transmission of the digital signal being selected such that, within the area covered by said one antenna, the digital signal power level of the digital, over said portion of the frequency band, is no more than 6 dB greater than the signal power level of the analog signal over said portion.

21. An arrangement as claimed in claim 20, characterized in that said antenna provides coverage of a sector no wider than approximately 180°.

22. An arrangement as claimed in claim 20, characterized in that said at least one antenna transmits both the digital signal and the analog signal.

23. An arrangement as claimed in claim 20, characterized in that said at least one antenna includes a plurality of antennas for transmitting respective digital signals over different respective carrier frequencies, with a same polarization, and the means for transmitting an analog signal include a further antenna having a beam angle approximately equal to the sum of the respective beam angles of the plurality of antennas.

24. An arrangement as claimed in claim 23, characterized in that the further antenna provides a beam angle of approximately 180°.

25. An arrangement as claimed in claim 20, characterized in that the means for transmitting an analog signal include an omnidirectional antenna.

26. An arrangement as claimed in claim 20, characterized in that the further antenna transmits at a frequency above 12 MHz.

27. A method of transmitting a plurality of signals within a frequency band from a transmitting location, for selective reception by a subscriber receiver located within a cell, comprising:

transmitting analog signals occupying substantially all of said frequency band, said analog signals including program signals representing at least one communicated program transmitted at a program carrier frequency within the band and occupying one program channel, characterized in that the method further comprises:

transmitting digital signals representing a plurality of digital communications including five T-1 channels, using a plurality of digital carrier frequencies within said program channel, each digital carrier frequency being transmitted at a same given transmission power, said digital signals being entirely within said band and occupying substantially less of said frequency band than the analog signals representing said one communicated program, selecting each of said plurality of digital carrier frequencies, said first bit rate, and the given transmission power of the digital transmission such that a subscriber receiver can selectively receive and reliably detect either said one communicate program or one of said digital communications.

* * * * *